No. 837,885.        PATENTED DEC. 4, 1906.
H. C. RICKHEIT.
VEHICLE WHEEL.
APPLICATION FILED NOV. 25, 1905.

2 SHEETS—SHEET 1.

Witnesses
Edwin F. McKee
G. S. Elmore

Inventor
H. C. Rickheit
By Victor J. Evans
Attorney

No. 837,885. PATENTED DEC. 4, 1906.
H. C. RICKHEIT.
VEHICLE WHEEL.
APPLICATION FILED NOV. 25, 1905.
2 SHEETS—SHEET 2.
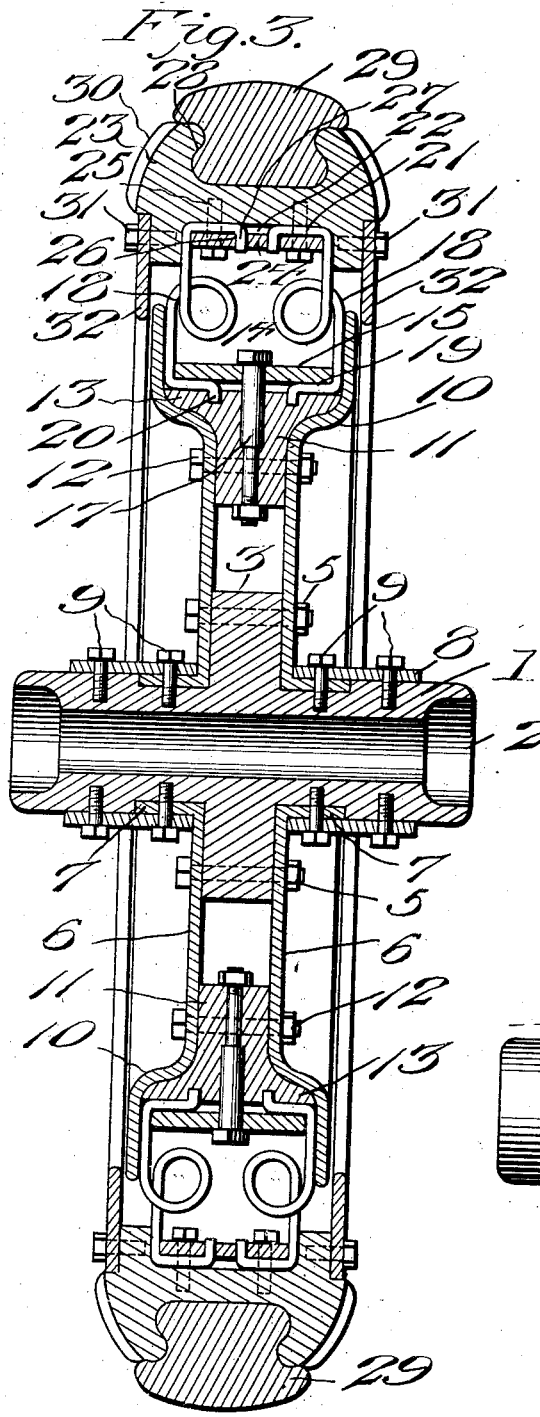
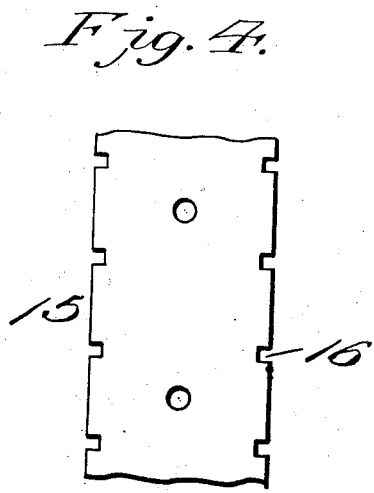
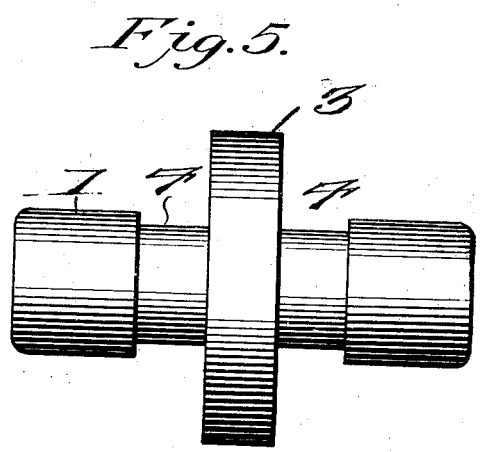
Witnesses
Edwin F. McKee
F. S. Elmor
Inventor
H. C. Rickheit
By Victor J. Evans
Attorney

UNITED STATES PATENT OFFICE.

HENRY C. RICKHEIT, OF PITTSFIELD, MASSACHUSETTS.

VEHICLE-WHEEL.

No. 837,885.    Specification of Letters Patent.    Patented Dec. 4, 1906.

Application filed November 25, 1905. Serial No. 289,099.

*To all whom it may concern:*

Be it known that I, HENRY C. RICKHEIT, a citizen of the United States, residing at Pittsfield, in the county of Berkshire and State of Massachusetts, have invented new and useful Improvements in Vehicle-Wheels, of which the following is a specification.

This invention relates to vehicle-wheels designed especially for use upon motor-vehicles, and has for its objects to provide a comparatively simple inexpensive device of this character which will be free from liability of slipping or becoming punctured, one which will possess the requisite amount of yieldability and one the parts of which may be readily assembled and will be securely connected.

With these and other objects in view the invention comprises the novel features of construction and combination of parts more fully hereinafter described.

Figure 1:
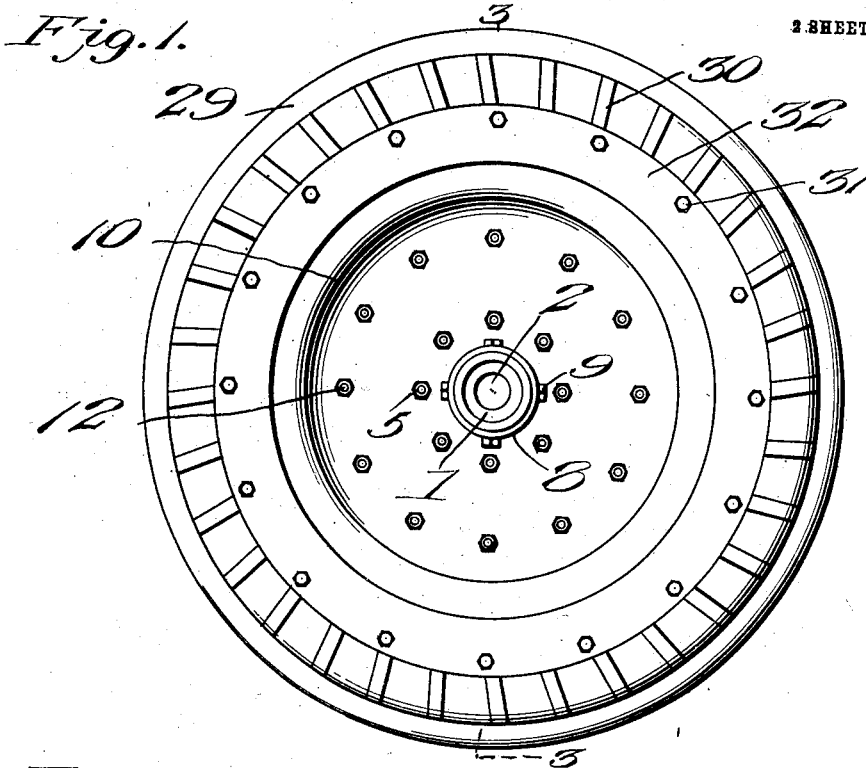
Figure 2:
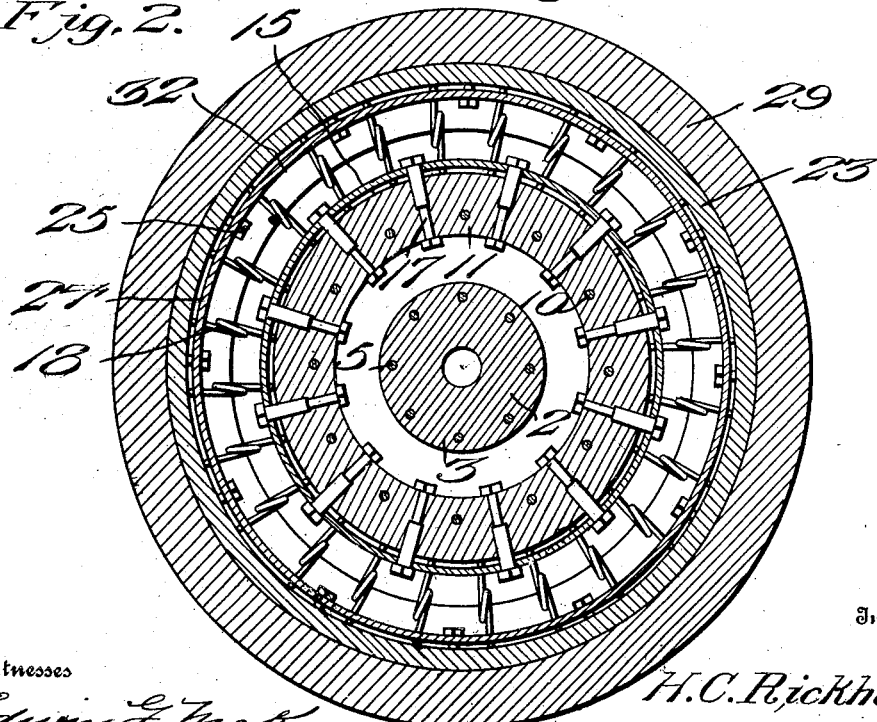

In the accompanying drawings, Figure 1 is a side elevation of a vehicle-wheel embodying the invention. Fig. 2 is a section taken centrally through the wheel. Fig. 3 is a cross-section taken on the line 3 3 of Fig. 1 and showing the parts on an enlarged scale. Fig. 4 is a detail view of a portion of the spring-retaining band. Fig. 5 is a side elevation of the hub.

Referring to the drawings, 1 designates the hub, provided with a central spindle-receiving bore 2 and having a central annular flange 3 and a pair of marginal recesses or seats 4, disposed respectively on opposite sides of the flange, there being attached to the hub 1, by means of bolts 5, extended transversely through the flange 3, side plates 6, having inner edge flanges 7, seated in the recesses 4, the plates 6, which constitute the web of the wheel being further secured to the hub by sleeves 8, applied to the latter over the flanges 7 and held in place by inner and outer sets of screw-bolts 9, of which the inner set passes through the flanges 7, which latter, it will be understood, may be slit for application over the ends of the hub. The plates 6 are laterally offset or flanged near their marginal edges to form annular shoulders 10, while seated between the plates is an annular bearing member or ring 11, secured in place by transverse bolts 12 and having laterally-projecting bearing portions or flanges 13, which are shaped to conform to and fit upon the annular shoulders 10, the plates being extended beyond the member 11 in parallel relation to present a peripheral recess 14, in which is seated a strap-metal clamping member or band 15, provided at its longitudinal edges with notches or recesses 16 and maintained in place by clamping-bolts 17, extended radially through the bearing-ring 11. Arranged in the recess 14 and projecting radially therefrom are two sets or series of cushioning-springs 18, disposed oppositely in pairs and provided at their inner ends with inwardly-extending portions or arms 19, clamped between the members 11 and 15 and having terminal fingers 20, engaged in suitable notches formed in the outer faces of the bearing member 11, there being formed at the outer ends of the springs inwardly-extending portions or arms 21, seated in a recess 22, formed in the inner face of the wheel-rim 23 and clamped thereto by means of a clamping member or band 24, in turn secured in the recess by clamping-screws 25 and having transverse openings or perforations 26 to receive fingers 27, terminally formed upon the inner ends of the arms 21.

Formed in the outer face of the rim 23 is a dovetailed marginal groove or recess 28, in which is fitted a rubber or other elastic tire 29, while formed at spaced intervals on the side face of the rim are radially-disposed strengthening-ribs 30, there being detachably secured to the sides of the rim by fastening members or bolts 31 annular protecting-plates 32, which project inwardly from the rim to overlap the outer edges of the side plates 6, thus concealing from view and protecting the springs 18.

In practice as the wheel travels over the ground the rim 23 will yield radially to surface irregularities, owing to the cushioning action of the springs 18, the provision of which imparts to the wheel the desirable properties usually derived from a pneumatic tire, while at the same time the objectionable features of the pneumatic tire—such, for example, as its liability to become punctured—are obviated. It is to be particularly noted that under the foregoing construction the wheel is rendered unusually strong and durable, while at the same time the component parts thereof, which are of simple construction and may be inexpensively manufactured, are susceptible of ready disconnection, whereby broken or worn parts may be conveniently replaced by new ones.

From the foregoing it is apparent that I produce a simple device admirably adapted for the attainment of the ends in view, it being understood that in attaining these ends minor changes in the details herein set forth may be resorted to without departing from the spirit of the invention.

Having thus described my invention, what I claim as new is—

1. A wheel comprising a hub having a marginal flange, side plates attached to said flange and constituting a web, a bearing member connected in said web near its periphery, cushioning-springs having angular terminal portions seated on the bearing member, a clamping-plate applied to and for clamping said portions to the bearing member, a rim marginally surrounding and spaced from the web, and means for detachably engaging the outer ends of the springs with the rim.

2. A wheel comprising a hub and web, a rim marginally surrounding and spaced from the latter, said rim being provided with an undercut peripheral groove and having laterally-projecting strengthening-ribs, a tire seated in said groove, cushioning-springs disposed between and connected with the web and rim and protecting-plates detachably secured to the latter and extended to overlap the web for housing the springs.

In testimony whereof I affix my signature in presence of two witnesses.

HENRY C. RICKHEIT.

Witnesses:
SAMUEL E. DORGAN,
VICTOR HILL.